(12) United States Patent
Kwon (10) Patent No.: US 11,305,715 B2
(45) Date of Patent: Apr. 19, 2022

(54) DRIVER AIRBAG DEVICE

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 92 days.

(21) Appl. No.: 16/668,361

(22) Filed: Oct. 30, 2019

(65) Prior Publication Data
US 2020/0148155 A1 May 14, 2020

(30) Foreign Application Priority Data

Nov. 13, 2018 (KR) ........................ 10-2018-0138855

(51) Int. Cl.
*B60R 21/203* (2006.01)

(52) U.S. Cl.
CPC ................................ *B60R 21/2037* (2013.01)

(58) Field of Classification Search
CPC .............. B60R 21/203; B60R 21/2035; B60R 21/2037
See application file for complete search history.

(56) References Cited

U.S. PATENT DOCUMENTS

| | | | | |
|---|---|---|---|---|
| 5,239,147 A * | 8/1993 | Allard | ................. | B60R 21/2037 200/61.54 |
| 5,350,190 A * | 9/1994 | Szigethy | ................ | B60Q 5/003 200/61.55 |
| 5,410,114 A * | 4/1995 | Furuie | .................... | B60Q 5/003 200/61.55 |
| 5,762,359 A * | 6/1998 | Webber | ............... | B60R 21/2035 280/728.2 |
| 5,810,535 A * | 9/1998 | Fleckenstein | ........... | B60R 21/20 411/522 |
| 5,924,831 A * | 7/1999 | Ricks | .................... | F16B 21/086 411/508 |
| 5,931,492 A * | 8/1999 | Mueller | ................. | B60Q 5/003 280/728.2 |
| 6,082,758 A * | 7/2000 | Schenck | ................ | B60Q 5/003 200/305 |
| 6,257,615 B1 * | 7/2001 | Bohn | ..................... | B60Q 5/003 200/61.54 |
| 6,592,141 B1 * | 7/2003 | Dancasius | ........... | B60R 21/2037 280/728.1 |
| 7,118,125 B2 * | 10/2006 | Lee | ........................ | B60Q 5/003 280/731 |
| 7,963,554 B2 * | 6/2011 | Nakagawa | .......... | B60R 21/2037 280/731 |
| 8,616,577 B1 * | 12/2013 | Matsu | ................. | B60R 21/2037 280/728.2 |
| 9,884,603 B2 * | 2/2018 | Kim | .................... | B60R 21/2037 |

(Continued)

*Primary Examiner* — Barry Gooden, Jr.
(74) *Attorney, Agent, or Firm* — DLA Piper LLP (US)

(57) ABSTRACT

A driver airbag device may include: a housing having an airbag module mounted therein, and configured to induce a horn operation while moved backward by an external force; a boss part formed on the housing; a steering wheel part mounted in the housing, configured to sense a horn operation and perform a steering operation, and having the boss part installed therethrough; and a movement prevention part mounted on the boss part, and configured to prevent movement of the housing connected to the boss part.

7 Claims, 7 Drawing Sheets

(56) References Cited

U.S. PATENT DOCUMENTS

| | | | |
|---|---|---|---|
| 2002/0124682 A1* | 9/2002 | Schutz | B60R 21/2037 |
| | | | 74/552 |
| 2005/0230942 A1* | 10/2005 | Erlingstam | B60R 21/2035 |
| | | | 280/731 |
| 2006/0175816 A1* | 8/2006 | Spencer | B60R 21/2037 |
| | | | 280/731 |
| 2006/0197323 A1* | 9/2006 | Pillsbury, IV | B60Q 5/003 |
| | | | 280/731 |
| 2009/0218739 A1* | 9/2009 | Terada | B62D 7/222 |
| | | | 267/2 |
| 2013/0026741 A1* | 1/2013 | Onohara | B60R 21/2037 |
| | | | 280/731 |
| 2017/0036687 A1* | 2/2017 | Obayashi | B62D 1/04 |
| 2020/0043679 A1* | 2/2020 | Nonoyama | B60R 21/2037 |
| 2020/0101997 A1* | 4/2020 | Ikeda | B62D 1/11 |
| 2020/0130630 A1* | 4/2020 | Schmeier | B60Q 5/003 |
| 2020/0139917 A1* | 5/2020 | Funk | B60R 21/2035 |
| 2020/0317123 A1* | 10/2020 | Osterfeld | B60R 21/203 |
| 2020/0339192 A1* | 10/2020 | Myklebust | B60R 21/203 |
| 2021/0031684 A1* | 2/2021 | Matsuo | B62D 1/04 |
| 2021/0269080 A1* | 9/2021 | Kim | B62D 7/222 |

* cited by examiner

DRIVER AIRBAG DEVICE

CROSS-REFERENCE TO RELATED APPLICATION

The present application claims priority under 35 U.S.C. § 119(a) to Korean Patent Application No. 10-2018-0138855 filed on Nov. 13, 2018 in the Korean Intellectual Property Office, which is incorporated herein by reference in its entirety.

BACKGROUND

1. Technical Field

Embodiments of the present disclosure relate to a driver airbag device, and more particularly, to a driver airbag device which enables a driver to smoothly perform a horn operation, and absorbs shock.

2. Related Art

In general, an airbag system of a vehicle refers to a device which is installed separately from a seat belt, and momentarily inflates an airbag (air pocket) between a driver and a steering wheel part or between a passenger in a passenger seat and an instrument panel in case of a collision, thereby reducing damage caused by shock.

Among such airbag systems, an airbag system for a driver in a driver seat includes an airbag module for a driver seat, a shock sensor and an electronic control module. The airbag module includes an inflator configured to generate gas through ignition of a detonator, an airbag inflated and deployed toward the driver in the driver seat by the generated gas, a mounting plate having the inflator installed thereon and fixed to a cover member installed on the steering wheel part through a bolt or the like, and a horn plate installed over the mounting plate. The shock sensor is configured to generate a shock signal in case of a collision. The electronic control module is configured to ignite the detonator of the inflator according to the shock signal.

The airbag system according to the related art employs a snap-fit structure to maintain the coupling state between the mounting plate and the steering wheel part, when the airbag is deployed. Furthermore, a boss formed on the mounting plate is disposed through the steering wheel part, and a spring surrounding the boss elastically supports the mounting plate. In the related art, however, the boss and the mounting plate are spaced apart from each other. Therefore, when a horn is operated, movement may occur to make a driver feel a sense of difference. Therefore, there is a need for a device capable of solving the problem.

SUMMARY

Various embodiments are directed to a driver airbag device which enables a driver to smoothly perform a horn operation, and absorbs shock.

In an embodiment, a driver airbag device may include: a housing having an airbag module mounted therein, and configured to induce a horn operation while moved backward by an external force; a boss part formed on the housing; a steering wheel part mounted in the housing, configured to sense a horn operation and perform a steering operation, and having the boss part installed therethrough; and a movement prevention part mounted on the boss part, and configured to prevent movement of the housing connected to the boss part.

The housing may include: a bottom plate having the airbag module seated thereon; a storage wall extended upward from an edge of the bottom plate, and having the airbag module stored therein; and a horn pressing part formed on the bottom surface of the bottom plate, and configured to perform a horn operation through contact with the steering wheel part.

The steering wheel part may include: a wheel plate having a boss hole through which the boss part is disposed; a wheel sensor formed on the wheel plate and configured to sense whether the horn pressing part is contacted; and a wheel hook formed on the wheel plate, and locked and fixed to the housing.

The movement prevention part may include: a first damper having the boss part inserted therein, and configured to suppress side-to-side vibration; a second damper having the first damper inserted therein, and disposed through the boss hole; and a third damper surrounding the second damper, disposed between the housing and the wheel plate, and having elasticity.

The first damper may be formed of rubber or silicone.

The first damper may have a first damper hole formed in the center thereof such that the boss part is passed through the first damper hole, and have an outer diameter that increases toward the bottom.

The second damper may include: a second damper upper part formed in a pipe shape whose outer diameter increases toward the bottom; and a second damper lower part extended from the bottom of the second damper upper part, and contacted with the boss hole.

The second damper may be formed of thermoplastic resin.

The boss hole may include: a hole upper protrusion having an inner diameter that decreases toward the bottom; a hole contact part extended downward from the hole upper protrusion, and contacted with the second damper lower part; and a hole lower protrusion extended downward from the hole contact part, and having an inner diameter that increases toward the bottom.

When the second damper lower part is moved downward and spaced apart from the hole contact part, the housing may be rotatable.

In the driver airbag device in accordance with the embodiment of the disclosure, the movement prevention part may suppress vibration caused by side-to-side and top-to-bottom movement of the housing.

Furthermore, since the movement prevention part is partially contacted with the steering wheel part, the movement prevention part may be spaced apart from the steering wheel part when the housing is pressed for a horn operation, which makes it possible to improve the horn operationality.

DETAILED DESCRIPTION

Hereinafter, a driver airbag device will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

Figure 1:
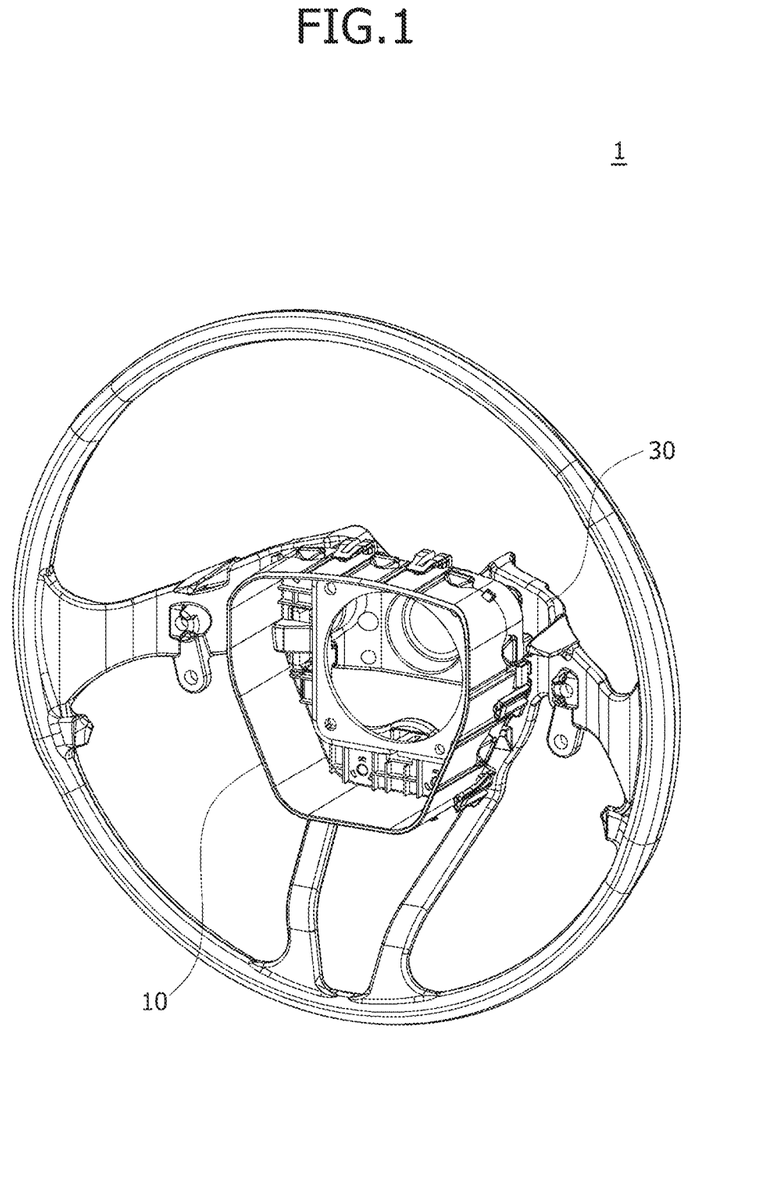
FIG. 1 is a diagram schematically illustrating a driver airbag device in accordance with an embodiment of the disclosure.
Figure 2:
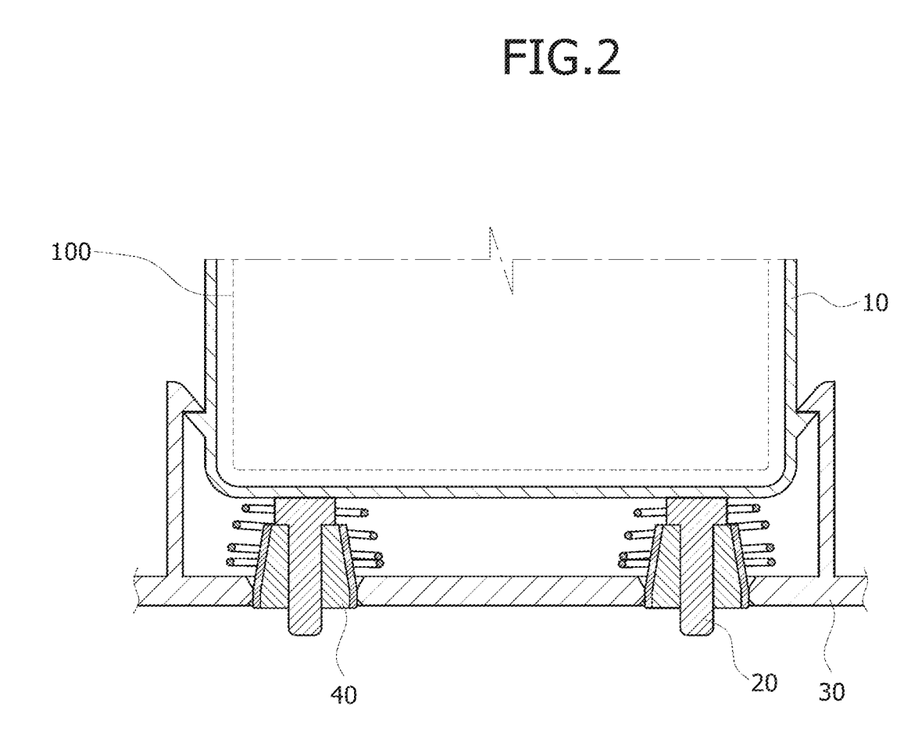
FIG. 2 is a cross-sectional view schematically illustrating the driver airbag device in accordance with the embodiment of the disclosure.

FIG. 1 is a diagram schematically illustrating a driver airbag device in accordance with an embodiment of the disclosure, and FIG. 2 is a cross-sectional view schematically illustrating the driver airbag device in accordance with the embodiment of the disclosure. Referring to FIGS. 1 and 2, the driver airbag device 1 in accordance with the embodiment of the disclosure includes a housing 10, a boss part 20, a steering wheel part 30 and a movement prevention part 40.

The housing 10 has an airbag module 100 mounted therein. The housing 10 has one open side, and the airbag module 100 includes an inflator and an airbag cushion deployed by gas generated when a detonator of the inflator is ignited, and is mounted in the housing 10. The housing 10 may be moved backward by an external force to perform a horn operation. The boss part 20 is formed at the bottom of the housing 10, and protrudes toward the steering wheel part 30.

The steering wheel part 30 is mounted on the bottom surface of the housing 10. The steering wheel part 30 may have a steering shaft mounted thereon to enable a driver to perform a steering operation. For example, when the driver rotates a steering wheel, the steering wheel part 30 interlocked with the steering wheel may be rotated, and the steering shaft mounted on the steering wheel part 30 may be rotated to adjust the angle of wheels. The steering wheel part 30 may sense a horn operation when the housing 10 is moved backward. The boss part 20 may be installed through the steering wheel part 30.

The movement prevention part 40 is mounted on the boss part 20 and prevents movement of the housing 10 connected to the boss part 20. Such a movement prevention part 40 may be coupled to the boss part 20 so as to surround the boss part 20, and suppress side-to-side movement and top-to-bottom movement of the housing 10.

Figure 3:
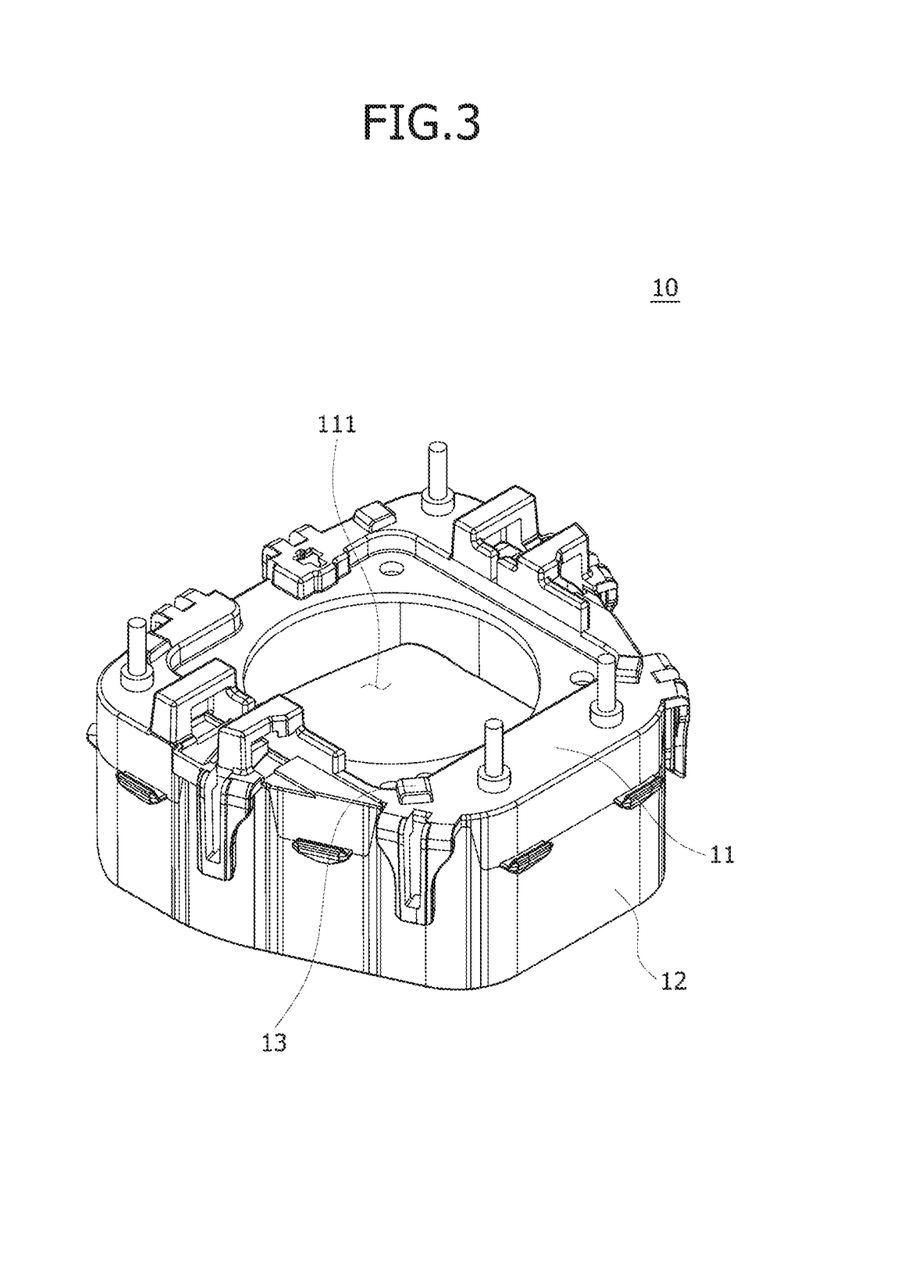
FIG. 3 is a diagram schematically illustrating a housing in accordance with the embodiment of the disclosure.

FIG. 3 is a diagram schematically illustrating the housing in accordance with the embodiment of the disclosure. Referring to FIG. 3, the housing 10 in accordance with the embodiment of the disclosure includes a bottom plate 11, a storage wall 12 and a horn pressing part 13.

The bottom plate 11 has the airbag module 100 seated thereon. The bottom plate 11 may have an installation hole 111 formed in the center thereof, the installation hole 111 serving as a space for installing the inflator of the airbag module 100.

The storage wall 12 is extended from the edge of the bottom plate 11 toward the top. The airbag module 100 may be surrounded and protected by the storage wall 12. The airbag module 100 has a cuttable cover plate formed on the top surface thereof. When the airbag cushion is deployed, the cover plate may be cut to protect a driver.

The horn pressing part 13 is formed on the rear surface of the bottom plate 11. At this time, the plurality of horn pressing parts 13 may be uniformly distributed and disposed along the edge of the bottom plate 11. For example, the pair of horn pressing parts 13 may be disposed at the edge of the bottom plate 11 so as to be spaced apart from each other. When a driver presses the housing 10, the bottom plate 11 may be moved toward the steering wheel part 30. When the steering wheel part 30 senses the horn pressing part 13, a separate warning device may generate a warning sound.

Figure 4:
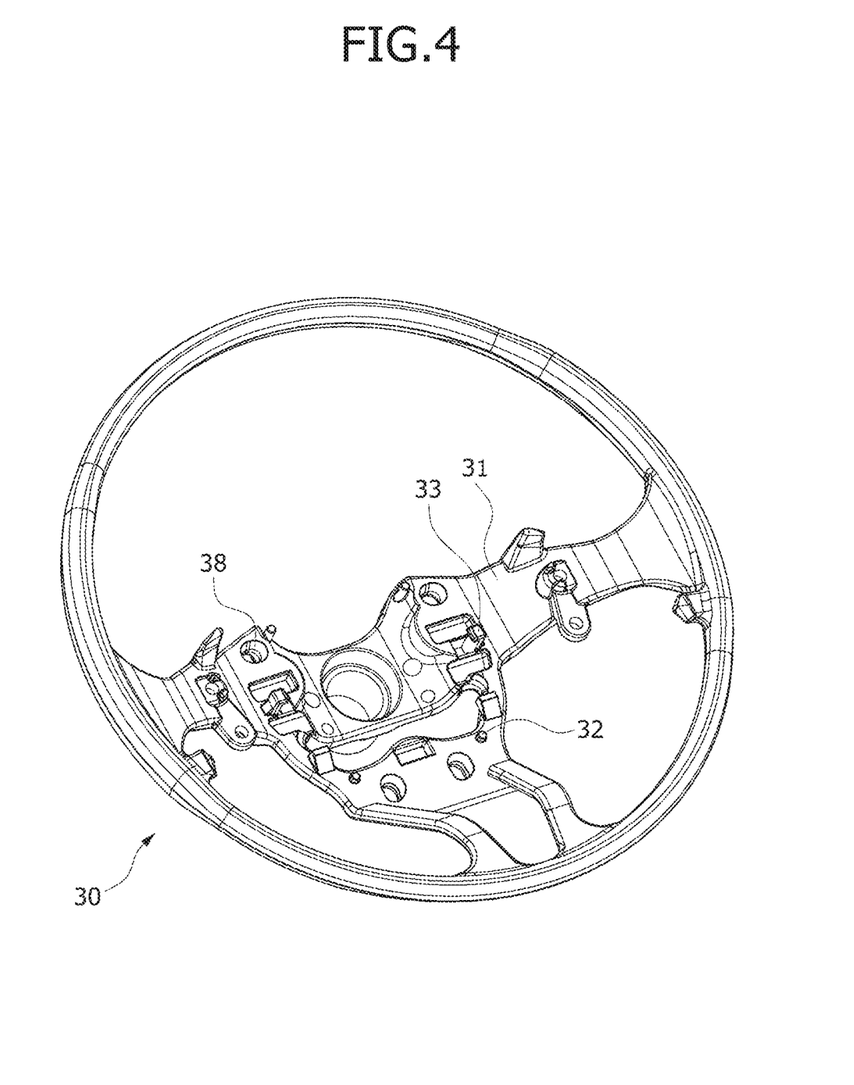
FIG. 4 is a diagram schematically illustrating a steering wheel part in accordance with the embodiment of the disclosure.

FIG. 4 is a diagram schematically illustrating the steering wheel part in accordance with the embodiment of the disclosure. Referring to FIG. 4, the steering wheel part 30 in accordance with the embodiment of the disclosure includes a wheel plate 31, a wheel sensor 32 and a wheel hook 33.

The wheel plate 31 has a boss hole 38 through which the boss part 20 is passed. When the boss part 20 is inserted into each of the plurality of boss holes 38, the assembling position of the housing 10 may be induced as designed.

The wheel sensor 32 is formed on the wheel plate 31 and senses whether the horn pressing part 13 is contacted. When the horn pressing part 13 is contacted by the wheel sensor 32, a warning sound is generated.

The wheel hook 33 is mounted on the wheel plate 31, and hooked and fixed to the housing 10. For example, the wheel hook 33 may have a rod shape of which an end is inclined, and protrude in a lateral direction of the housing 10 so as to be assembled to the outside of the housing 10 in a snap-fit manner. When the wheel hook 33 is mounted on the housing 10, the coupling between the housing 10 and the steering wheel part 30 may be maintained even when the airbag module 100 is deployed.

Figure 5:
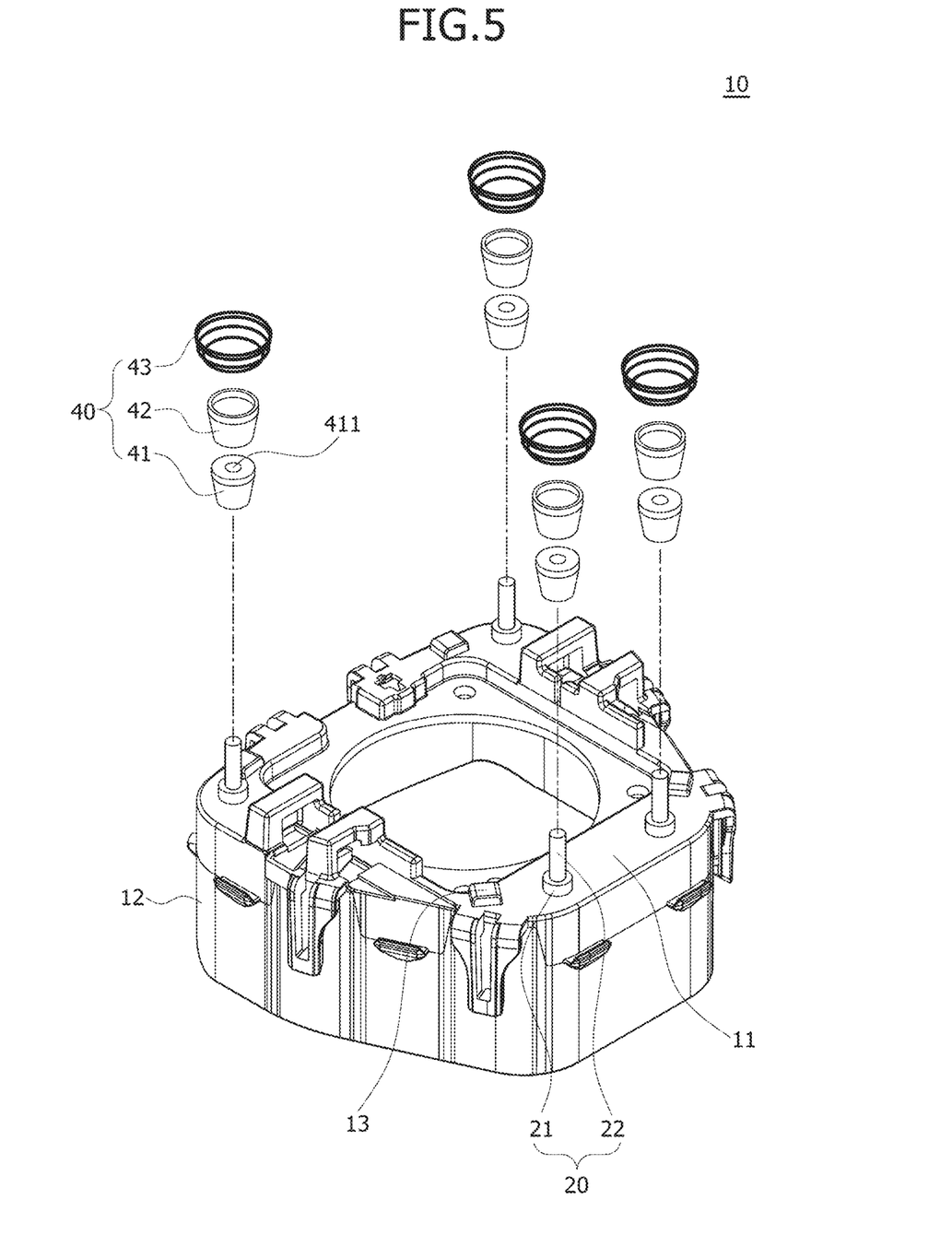
FIG. 5 is a diagram schematically illustrating a movement prevention part in accordance with the embodiment of the disclosure.
Figure 6:
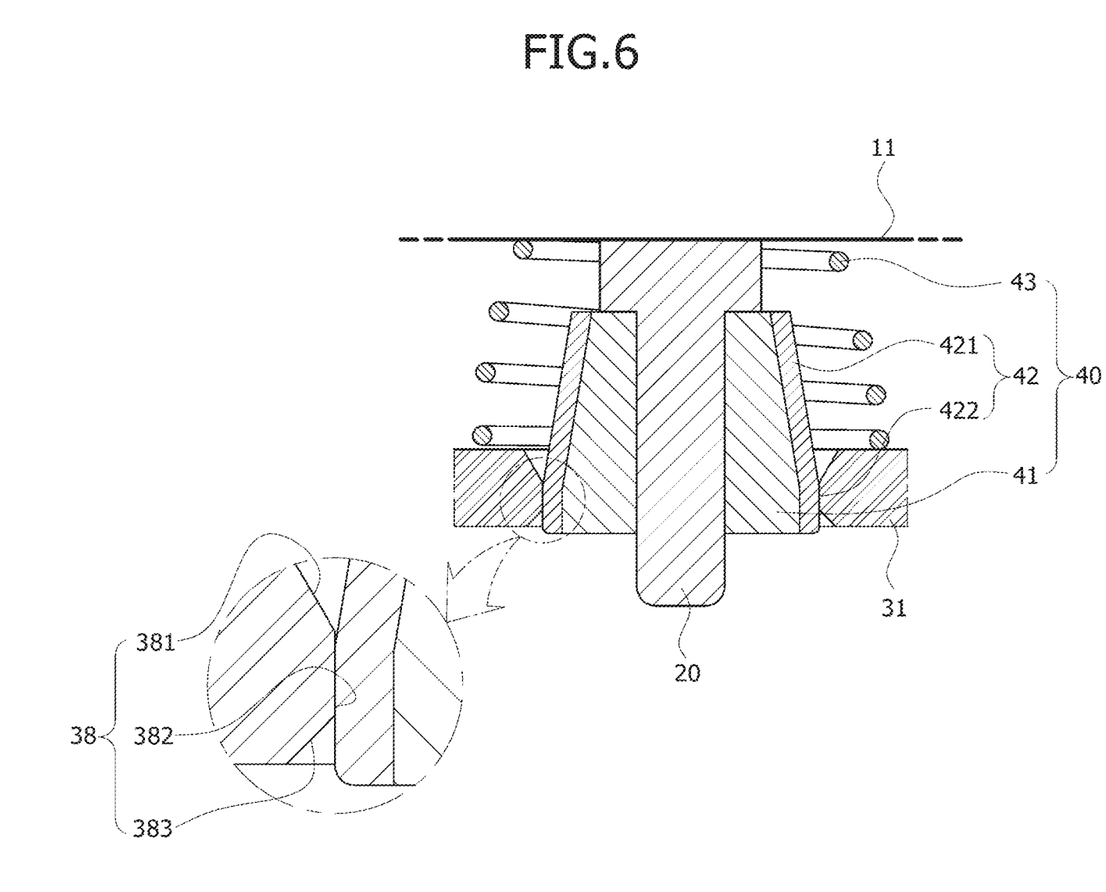
FIG. 6 is an exploded cross-sectional view schematically illustrating the movement prevention part in accordance with the embodiment of the disclosure.
Figure 7:
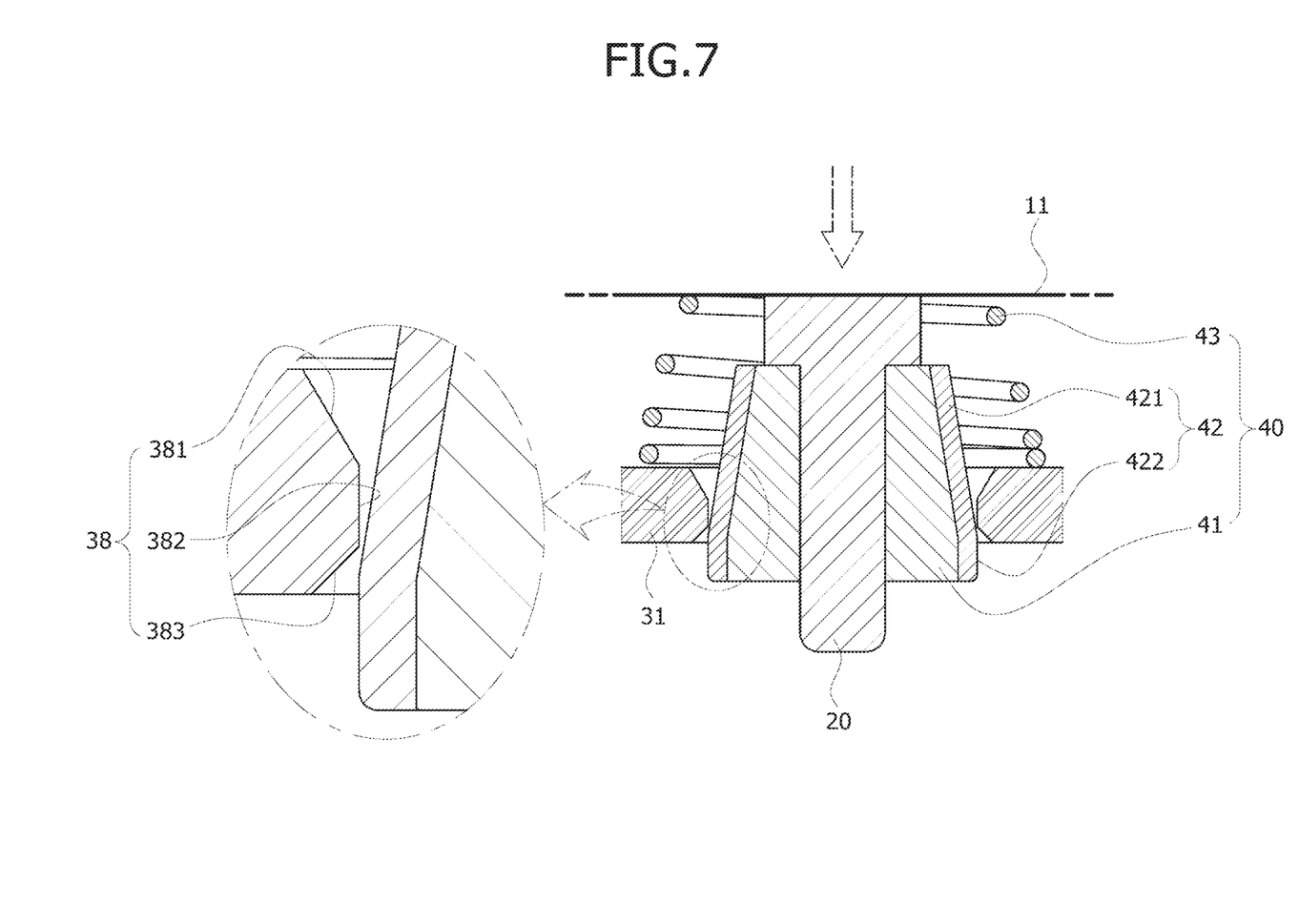
FIG. 7 is a diagram schematically illustrating a horn operation state in FIG. 6.

FIG. 5 is a diagram schematically illustrating the movement prevention part in accordance with the embodiment of the disclosure, FIG. 6 is an exploded cross-sectional view schematically illustrating the movement prevention part in accordance with the embodiment of the disclosure, and FIG. 7 is a diagram schematically illustrating a horn operation state in FIG. 6. Referring to FIGS. 5 to 7, the movement prevention part 40 in accordance with the embodiment of the disclosure includes a first damper 41, a second damper 42 and a third damper 43.

The boss part 20 is inserted into the first damper 41 so as to suppress side-to-side vibration. For example, the boss part 20 may include a boss head 21 formed on the bottom surface of the bottom plate 11 and a boss body 22 extended downward from the boss head 21 and having a smaller outer diameter than the boss head 21. The first damper 41 may have a first damper hole 411 formed in the center thereof, such that the boss body 22 is placed through the first damper hole 411. The first damper 41 may have an outer diameter that increases toward the bottom (see FIG. 6). The first damper 41 may be formed of rubber or silicone. Thus, although the airbag module 100 is rolled by vibration, the boss part 20 inserted into the first damper 41 may suppress side-to-side vibration while pressing the first damper 41. The top of the first damper 41 may be locked to the boss head 21 to retrain the movement of the first damper 41, and the first damper 41 may be interlocked with the boss part 20.

The second damper 42 into which the first damper 41 is inserted is passed through the boss hole 38. For example, the second damper 42 may be formed in a pipe shape in which the first damper 41 is embedded, and made of thermoplastic resin such as polyacetal. The second damper 42 may have a shape corresponding to the first damper 41, and include a second damper upper part 421 and a second damper lower part 422.

The second damper upper part 421 may have a pipe shape whose outer diameter increases toward the bottom, and thus have an inclined surface formed on the outside thereof. The second damper lower part 422 is extended from the bottom of the second damper upper part 421. The second damper lower part 422 may have the same outer diameter as the inner diameter of the boss hole 38, and thus come in surface contact with the boss hole 38.

The third damper 43 surrounds the second damper 42, is disposed between the housing 10 and the wheel plate 31, and has elasticity to provide a restoring force to the housing 10. For example, the third damper 43 may be formed in a coil spring shape to surround the second damper 42, and disposed between the bottom plate 11 and the wheel plate 31 to return the housing 10, from which an external force is removed, to the original position.

The boss hole 38 includes a hole upper protrusion 381, a hole contact part 382 and a hole lower protrusion 383.

The hole upper protrusion 381 has an inner diameter that decreases toward the bottom, and the hole contact part 382 is extended downward from the hole upper protrusion 381 so as to come in surface contact with the second damper lower part 422. The hole lower protrusion 383 may be extended downward from the hole contact part 382, and formed in a shape whose inner diameter increases toward the bottom. Thus, although the second damper 42 is passed through the boss hole 38, the second damper lower part 422 may be brought in surface contact with the hole contact part 382, and restrained from moving. At this time, the contact area between the hole contact part 382 and the boss hole 38 may be minimized to suppress resistance. When the second damper lower part 422 is moved downward and spaced apart from the hole contact part 382 while the housing 10 is pressed, the contact between the second damper 42 and the boss hole 38 may be removed to rotate the housing 10.

The operation of the driver airbag device in accordance with the embodiment of the disclosure, which has the above-described structure, will be described as follows.

With the airbag module 100 mounted in the housing 10, the boss part 20 protrudes downward from the bottom plate 11 of the housing 10, and the movement prevention part 40 coupled to the boss part 20 is passed through the boss hole 38 formed in the steering wheel part 30.

At this time, the movement prevention part 40 includes the first damper 41 surrounding the boss part 20 and made of an elastic material, the second damper 42 surrounding the first damper 41 and contacted with the boss hole 38, and the third damper 43 formed in a spring shape to elastically support the housing 10.

In this state, when the housing 10 is moved from side to side, the boss part 20 presses the first damper 41 in the side-to-side direction to suppress vibration. At this time, the second damper 42 maintains the contact with the boss hole 38.

When a driver presses a part of the housing 10 to perform a horn operation, the pressing of the housing 10 moves the boss part 20 and the first and second dampers 41 and 42 mounted on the boss part 20 downward, and contracts the third damper 43.

At this time, the second damper 42 is moved downward and spaced apart from the boss hole 38. Thus, during a horn operation, the housing 10 is induced to partially rotate, thereby enabling the driver to perform a smooth horn operation.

In the driver airbag device 1 in accordance with the embodiment of the disclosure, the movement prevention part 40 may suppress vibration caused by side-to-side and top-to-bottom movement of the housing 10.

Furthermore, since the movement prevention part 40 is partially contacted with the steering wheel part 30, the movement prevention part 40 may be spaced apart from the steering wheel part 30 when the housing 10 is pressed for a horn operation, which makes it possible to improve the horn operationality.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A driver airbag device comprising:
a housing having an airbag module mounted therein, and configured to induce a horn operation while moved backward by an external force, the housing comprising:
   a bottom plate having the airbag module seated thereon;
   a storage wall extended upward from an edge of the bottom plate, and having the airbag module stored therein and;
   a horn pressing part formed on a bottom surface of the bottom plate;
a boss part formed on the housing;
a steering wheel part mounted in the housing, configured to sense a horn operation and perform a steering operation, and having the boss part installed therethrough, the steering wheel part comprising:
   a wheel plate including a boss hole through which the boss part is disposed;
   a wheel sensor formed on the wheel plate and configured to sense whether the horn pressing part is contacted, wherein the horn pressing part is configured to perform the horn operation through contact with the steering wheel part; and
   a wheel hook formed on the wheel plate, and locked and fixed to the housing; and
a movement prevention part mounted on the boss part, and configured to prevent movement of the housing connected to the boss part, the movement prevention part including at least one damper, wherein the at least one damper comprises:
   a first damper having the boss part inserted therein, and configured to suppress side-to-side vibration;
   a second damper having the first damper inserted therein, and disposed through the boss hole; and
   a third damper surrounding the second damper, disposed between the housing and the wheel plate, and having elasticity.

2. The driver airbag device of claim 1, wherein the first damper is formed of rubber or silicone.

3. The driver airbag device of claim 1, wherein the first damper has a first damper hole formed in a center thereof such that the boss part is passed through the first damper hole, and has an outer diameter that increases toward a bottom.

4. The driver airbag device of claim 1, wherein the second damper comprises:

a second damper upper part formed in a pipe shape whose outer diameter increases toward a bottom; and a second damper lower part extended from the bottom of the second damper upper part, and contacted with the boss hole.

5. The driver airbag device of claim 4, wherein the second damper is formed of thermoplastic resin.

6. The driver airbag device of claim 4, wherein the boss hole comprises:

a hole upper protrusion having an inner diameter that decreases toward the bottom;

a hole contact part extended downward from the hole upper protrusion, and contacted with the second damper lower part; and a hole lower protrusion extended downward from the hole contact part, and having an inner diameter that increases toward the bottom.

7. The driver airbag device of claim 6, wherein when the second damper lower part is moved downward and spaced apart from the hole contact part, the housing is rotatable.

* * * * *